United States Patent [19]

De brabandere et al.

[11] 4,057,429

[45] Nov. 8, 1977

[54] PREPARATION OF PHOTOGRAPHIC SILVER HALIDE EMULSIONS

[75] Inventors: Luc Achiel De brabandere, Mortsel; Robert Joseph Pollet, Vremde; Herman Alberik Pattyn, Kapellen; Hendrik Alfons Borginon, Mortsel, all of Belgium

[73] Assignee: AGFA-GEVAERT, N. V., Mortsel, Belgium

[21] Appl. No.: 666,206

[22] Filed: Mar. 12, 1976

[30] Foreign Application Priority Data

Apr. 9, 1975 United Kingdom ............... 14586/75

[51] Int. Cl.[2] .......................... G03C 1/02; B01J 17/00

[52] U.S. Cl. .................................. 96/94 R; 96/114.7; 23/295 G

[58] Field of Search .................... 96/94 R, 114.7, 109; 23/195 G

[56] References Cited

U.S. PATENT DOCUMENTS 3,843,372 10/1974 Jefferson ................................. 96/94

3,850,636 11/1974 Shimamura et al. .................... 96/50

FOREIGN PATENT DOCUMENTS 1,391,672 4/1975 United Kingdom ..................... 96/94

OTHER PUBLICATIONS

Glafkides—Photographic Chemistry, vol. I, Fountain Press, London, © 1957, pp. 286–287.

Birr–Stabilization of Photographic Silver Halide Emulsions. ©74, Focal Press, pp. 3 and 4.

Farnell—The Relationship Between Speed and Grain Size, J of Photo Sci., vol. 17, 1969, pp. 116–125.

*Primary Examiner*—David Klein
*Assistant Examiner*—Louis Falasco
*Attorney, Agent, or Firm*—A. W. Breiner

[57] ABSTRACT

In the preparation of silver halide emulsions silver halide grain-growth is accelerated by the addition to the precipitation medium during or before silver halide precipitation of a compound of the formula

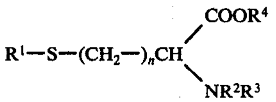

wherein:

$n$ is an integer from 1 to 5

$R^1$ is $C_1$–$C_5$ alkyl or substituted alkyl $R^2$ is hydrogen or $C_1$–$C_5$ alkyl or substituted alkyl, or a carboxylic acyl group $R^3$ is hydrogen or $C_1$–$C_5$ alkyl or substituted alkyl, and $R^4$ is hydrogen or $C_1$–$C_5$ alkyl or substituted alkyl group, aryl or substituted aryl or a salt-forming cation.

13 Claims, No Drawings

PREPARATION OF PHOTOGRAPHIC SILVER HALIDE EMULSIONS

The present invention relates to the preparation of photographic silver halide emulsions.

It is known that the primitive photographic sensitivity of silver halide emulsions i.e. the sensitivity before any chemical sensitization has taken place, increases with increasing grain-size.

In emulsion preparation, the silver halide grains are grown to the desired average grain-size and grain-size distribution by physical ripening which occurs subsequent to or concurrent with the precipitation of the silver halide grains. Physical ripening occurs in the presence of silver halide solvents, the most common of which are halide in excess to that used for the formation of the grains and ammonia (ammoniacal emulsions). Relatively coarse grained emulsions especially silver bromoiodide emulsions e.g. for X-ray recording are usually ammoniacal emulsions which may pose problems from an ecological standpoint owing to the presence of ammonia or ammonium ions in the waste waters of emulsion preparation factories. Other silver halide solvents that have been described from use as silver halide grain ripeners during the precipitation stage and/or the physical ripening stage include thiocyanates, a variety of amines such as morpholine and thioether compounds.

Organic thioether compounds for use in the precipitation and physical ripening stages of emulsion preparation have been described e.g. in U.S. Pat. No. 3,271,157 of Clarence E. McBride issued Sept. 6, 1966 for the preparation of print-out emulsions, in U.S. Pat. No. 3,531,289 of George F. L. Wood issued Sept. 29, 1970 for the preparation of developing-out emulsions precipitated in the presence of rhodium salts and in U.S. Pat. No. 3,574,628 of Evan T. Jones issued Apr. 13, 1971 for the preparation of direct-positive as well as negative monodispersed emulsions i.e. emulsions of high uniformity of grain-size. These thioether silver halide solvents have been broadly as thioether compounds which, when utilized in aqueous solutions (60° C) at 0.02 molar concentrations, are capable of dissolving more than twice the amount (by weight) of silver chloride than that which can be dissolved by water at 60° C. Preferred compounds are those containing at least one $-OCH_2CH_2S$-moiety, especially straight-chain thioalkane diols as represented by 1,8-dihydroxy-3,6-dithiaoctane.

The latter compounds are effective silver halide grain ripeners but normally tend to increase fog. Though this risk for fog formation can be reduced e.g. by reducing the amount of thioether compound employed, by extra-purification of the thioether compound used, or by special emulsion preparation techniques e.g. precipitation at pH values below 4 as described e.g. in French Pat. No. 1,497,202 filed Oct. 21, 1966 by Eastman Kodak Company to which there is referred in the above U.S. Pat. No. 3,574,628, these measures to reduce fog formation have several disadvantages. Thus, reducing the amount of thioether compound highly increases precipitation time for a given average grain-size which is not practical for industrial application. Extra-purification of the thioether compound is expensive, not practical on an industrial scale and not entirely satisfactory to eliminate fogging. Precipitation at pH values below 4 does not allow using coagulation-washing based on the use of acid-coagulable gelatin-derivatives e.g. phthaloyl gelatin during precipitation.

It has now been found that methionine, ethionine and structurally related compounds having besides thioether S-atom(s) amino and carboxyl groups in acid or salt form e.g. S-alkylcysteines as well as derivatives thereof in which the carboxyl groups have been esterified and/or the amino groups acylated or alkylated, when used in a concentration comprised between about 500 mg and about 30 g per mole of silver halide to be formed are effective silver halide grain ripeners to accelerate grain growth in the precipitation of the silver halide grains without increasing fog to a noteworthy extent. In the presence of these compounds it is even possible to form relatively coarse grains at approximately neutral or acid pH-values in acceptable precipitation times. Whereas the effect of the thioether grain ripeners referred to hereinbefore is substantially pH-independent, the effect of methionine, ethionine and the structurally related thioether compounds with amino and carboxyl groups on the grain growth increases with increasing pH so that it is possible to control grain-growth by means of pH. Moreover, by the use of these silver halide grain ripeners in the amounts given emulsions can be prepared which have high primitive sensitivity i.e. high sensitivity even before any chemical sensitization has taken place so that for a given average grain-size the sensitivity is higher than that obtained by conventional techniques.

The present invention therefore provides a method of preparing a silver halide emulsion by precipitation of silver halide grains in an aqueous solution of a peptizer and addition to the peptizer solution of a silver halide grain ripener to accelerate grain-growth wherein before or during precipitation from about 500 mg to about 30 g of a silver halide grain ripener corresponding to the following general formula is added to the peptizer solution per mole of silver halide to be formed.

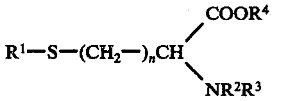

wherein:

*n* is an integer from 1 to 5, preferably 1 or 2

$R^1$ is a $C_1$–$C_5$ alkyl group e.g. methyl and ethyl, which may carry substituents e.g. hydroxy and carboxy in acid or salt form $R^2$ is hydrogn, $C_1$–$C_5$ alkyl or substituted alkyl or a carboxylic acyl group e.g. acetyl and benzoyl including the group

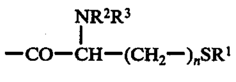

$R^3$ is hydrogen or a $C_1$–$C_5$ alkyl or substituted alkyl group, and $R^4$ is hydrogen, a $C_1$–$C_5$ alkyl or substituted alkyl group e.g. methyl, ethyl, and benzyl, an aryl group or substituted aryl group e.g. phenyl, and carboxyphenyl, or a salt forming cation e.g. sodium, potassium, ammonium, organic ammonium etc.

$R^2$, $R^3$, and $R^4$ preferably being hydrogen.

The above silver halide grain ripeners are preferably used in concentrations from about 1 g to about 15 g per mole of silver halide to be formed.

Representative examples of compounds corresponding to the above formula are: methionine, ethionine, S-methylcysteine, methionine methyl ester hydrochloride, N-acetyl methionine, N-acetyl methionine methyl ester, and the methionine dipeptide hydrochloride: $CH_3S(CH_2)_2CH(COOH)NH$-$COCH(NH_2.HCl)(CH_2)_2SCH_3$.

In accordance with the present invention methionine is preferred since methionine, being a natural degradation product of proteins, is very cheap and commercially available on a very wide scale. Moreover, methionine is one of the essential amino-acids for the nourishment of higher animals and therefore can be considered safe from an ecological standpoint.

As methionine is one of the aminoacids normally present in proteins e.g. gelatin, it is meant in the present invention that methionine is added in addition to any possible methionine already present in the peptizer used in emulsion making.

It is rather surprising that methionine accelerates grain growth during silver halide precipitation since it is generally accepted that methionine in gelating retards grain growth (P. Glafkides, Photographic Chemistry, Fountain Press, London, 1958, p. 281) and from Steigmann, Jl.Soc.Chem.Ind., 63 (1944) p. 316–317 it can be learned that methionine used in amounts of the order given above restrains Ostwald ripening.

The silver halide grain formation can occur according to any technique known in the art of silver halide emulsion preparation. The preferred technique according to the present invention is the double jet technique. According to the double jet precipitation technique an aqueous solution of the silver salt, more particularly silver nitrate and an aqueous solution of one or more halides more particularly alkali metal halides e.g. potassium bromide are added simultaneously by two separate jets to a stirred solution of the silver halide peptizer e.g. gelatin or a gelatin derivative.

The silver halide grain ripener used according to the present invention is preferably to the solution of the peptizer before precipitation starts. However, it can also be added to the peptizer solution during precipitation e.g. by means of a separate jet or via the jet from which the halide solution is added and/or via the jet from which the silver salt solution is added. When the compound is added during precipitation the addition need not cover the entire time needed for adding halide and/or silver salt solutions. It is also possible during addition of the compound to interrupt the precipitation. Moreover, the addition of silver halide grain ripener may occur continuously or with interruption.

As referred to hereinbefore, the effect on the grain-growth of the silver halide grain ripeners with amino and carboxyl groups varies with the pH of the emulsion so that for a given amount of such compound larger grains are obtained as the pH increases. During precipitation, it is generally speaking preferable to maintain the pH at a value between about 4 and about 9 preferably between about 5 and about 7.5.

The pAg of the emulsion is preferably not too high in order to avoid possible competition between the compound of the above formula and the excess halide ions, which may also act as silver halide solvent and form more stable silver halide complexes.

Dependent on the kind of the silver halide, it is generally suitable for the pAg to be between about 5 and about 11. When the halide is predominantly bromide, the pAg is generally between 6 and 11, preferably between about 7.7 and about 9.7 whereas when the halide is predominantly chloride the pAg is generally between 4.5 and 9, preferably between about 6 and about 8. Thus, generally speaking the most preferably pAg range is from about 6 the preferred lowest pAg for silver chloride to about 9.7 the preferred highest pAg for silver bromide.

It is very suitable for the temperature of precipitation to be between about 30° and about 90° C. It is possible to vary temperature during precipitation e.g. forming the nuclei at high temperature and then continuing the remainder of the crystal growth procedure at a lower temperature e.g. as described in U.S. Pat. No. 3,790,387 of Walter J. Musliner issued Feb. 5, 1974.

The silver halide emulsions formed in the presence of a silver halide grain ripener according to the present invention may comprise any of the silver halides generally employed in silver halide photography e.g. silver chloride, silver bromide, silver chlorobromide, silver chlorobromoiodide, silver chloroiodide, silver bromoiodide and the like. Preferred silver halide emulsions comprise at most 10 mole % of iodide. The method of the present invention is particularly valuable for the formation of high-sensitive silver bromide or silver bromoiodide emulsions e.g. X-ray emulsions and for the formation of graphic arts emulsions e.g. lithographic emulsions comprising at least 50 mole %, preferably at least 70 mole % of silver chloride at least 5 mole % of silver bromide and from 0 to 5 mole %, preferably less than 1% of silver iodide. The average grain-size of the silver halide emulsions made according to the present invention may vary between wide limits and depends on the intended use for the emulsion. Fine grain as well as course-grain emulsions can be made according to the present invention. The average grain size is preferably between about 150 nm and about 1500 nm. Particle size of silver halide grains can be determined using conventional techniques e.g. as described by Trivelli and M. Smith, The Photographic Journal, Vol. 69, 1939, p. 330–338, Loveland "ASTM symposium on light microscopy" 1953, p. 94–122 and Mees and Jones "The theory of the photographic process" (1966), Chapter II.

Dependent on the pH, pAg and concentration of silver halide grain ripener during precipitation, monodispersed as well as heterodispersed emulsions can be made according to the present invention, monodispersed emulsions being, however, preferred. Monodispersed emulsions in contrast to heterodispersed emulsions have been characterized in the art as emulsions of which at least 95% by weight or number of the grains have a diameter which is within about 40%, preferably within about 30% of the mean grain-diameter.

Silver halide grains having a narrow grain-size distribution can be obtained by controlling the conditions at which the silver halide grains are prepared using a double run procedure. In such a procedure, the silver halide grains are prepared by simultaneously running an aqueous solution of a water-soluble silver salt, for example, silver nitrate, and a water-soluble halide, for example, an alkali metal halide such as potassium bromide, into a rapidly agitated aqueous solution of a silver halide peptizer, preferably gelatin, a gelatin derivative or some other protein peptizer. The pH and the pAg employed in this type of procedure are interrelated. For example, changing one while maintaining the other constant at a given temperature can change the size frequency distribution of the silver halide grains which are formed. However, generally the most suitable temperature is between 30° to about 90° C, the pH is up to about 9, preferably between about 5 and about 7.5 and the pAg is up to about 9.7 preferably between about 7.7 and about 9.7 for emulsions the halide of which is predominantly bromide and between about 6 and about 8 for emulsions the halide of which is predominantly chloride. Suitable methods for preparing photographic silver halide emulsions generally having uniform particle size are disclosed in an article entitled "Ia: Properties of Photographic Emulsion Grains", by Klein and Moisar, The Journal of Photographic Science, vol. 12, 1963, pages 242–251; an article entitled "The Spectral Sensitization of Silver Bromide Emulsions on Different Crystallographic Faces" by Markocki, The Journal of Photographic Science, vol. 13, 1965, pages 85–89; an article entitled "Studies on Silver Bromide Sols, Part I. The Formation and Ageing of Monodispersed Siler Bromide Sols" by Ottewill and Woodbridge, The Journal of Photographic Science, vol. 13, 1965, pages 98–103 and an article entitled "Studies on Silver Bromide Sols, Part II. The Effect of Additives on the Sol Particles" by Ottewill and Woodbridge, The Journal of Photographic Science, vol. 13, 1965, pages 104–107.

The silver halide grains made according to the present invention can be of substantially regular shape or structure which means that at least 80%, preferably at least about 90–95% by weight are regular. Regular grains can be obtained by controlling the reaction conditions during grain growth, see e.g. the Klein and Moisar article referred to hereinbefore.

Precipitation of the silver halide may occur so as to form so-called "covered-grain" emulsions e.g. of the type described in U.K. Pat. No. 1,027,146 filed Aug. 30, 1963 by Agfa AG. For this purpose a monodisperse fine-grain silver halide emulsion is made first by the double jet precipitation technique whereupon silver halide precipitation is continued to form around the silver halide cores formed previously an outer shell of silver halide. In the preparation of such covered grain emulsions the thioether compound may be used at the stage of core precipitation and/or at the stage of shell precipitation.

Once the grains have reached their ultimate size and shape, the emulsions are generally washed to remove the by-products of grain-formation and grain-growth.

The emulsions may be chill-set, shredded and washed by leaching in cold water, or they may be washed by coagulation.

In accordance with the present invention, the emulsions are preferably washed by acid-coagulation techniques using acid-coagulable gelatin derivatives or anionic polymeric compounds.

Coagulation techniques using acid-coagulable gelatin derivatives have been described e.g. in U.S. Pat. Nos. 2,614,928 of Henry C. Yutzy and Gordon F. Frame issued Oct. 21, 1952, 2,614,929 of Henry C. Yutzy and Frederik J. Russell issued Oct. 21, 1952 and 2,728,662 of Owen H. Griswold issued Dec. 27, 1955. The acid-coagulable gelatin derivatives are reaction products of gelatin with organic carboxylic or sulphonic acid chlorides, carboxylic acid anhydrides, aromatic isocyanates or 1:4-diketones. The use of these acid-coagulable gelatin derivatives generally comprises precipitating the silver halide grains in an aqueous solution of the acid coagulable gelatin derivative or in an aqueous solution of gelatin to which an acid coagulable gelatin derivative has been added in sufficient proportion to impart acid-coagulable properties to the entire mass. Alternatively, the gelatin derivative may be added after the stage of emulsification in normal gelatin, and even after the physical ripening stage, provided it is added in an amount sufficient to render the whole coagulable under acid conditions. Examples of acid-coagulable gelatin derivatives suitable for use in accordance with the present invention can be found e.g. in the U.S. patent specifications referred to above. Particularly suitable are phthaloyl gelatin and N-phenylcarbamoyl gelatin.

It is also possible to wash the emulsion by coagulation techniques using anionic polymeric compounds. Such techniques have been described e.g. in German Pat. No. 1,085,422 filed Oct. 16, 1958 by Agfa AG. Particularly suitable anionic polymeric compounds are polystyrene sulphonic acid amd sulphonated copolymers of styrene. The anionic polymers can be added to the gelatin solution before precipitation of the silver halide grains or after the stage of emulsification. They are preferably added after the grains have reached their ultimate size and shape, i.e. just before washing. It is also possible to use anionic polymers in combination with acid-coagulable gelatin derivatives as described in the published German Pat. specification No. 2.337.172 (DOS) filed July 21, 1973 by Agfa-Gevaert AG. It is preferred to use low-molecular weight polystyrene sulphonic acid having a molecular weight of at most 30,000. The polystyrene sulphonic acid can be added to the gelatin solution from aqueous solution preferably comprising from 5 to 20% by weight of polystyrene sulphonic acid. The amounts used suffice to impart coagulation properties to the emulsion and can easily be determined by those skilled in the art.

After the emulsification and physical ripening stage, the silver halide emulsion comprising acid-coagulable gelatin derivative or anionic polymer is acidified e.g. by means of dilute sulphuric acid, citric acid, acetic acid, etc. so as to effect coagulation. Coagulation generally occurs at a pH value comprised between about 3 and about 4. The coagulum formed may be removed from the liquid by any suitable means, for example the supernatant liquid is decanted or removed by means of a siphon, whereupon the coagulum is washed out once or several times.

Washing of the coagulum may occur by rinsing with mere cold water. However, the first wash water is preferably acidified to lower the pH of the water to the pH of the coagulation point. Anionic polymer e.g. polystyrene sulphonic acid may be added to the wash-water even when an acid coagulable gelatin derivative has been used e.g. as described in published German Pat. (DOS) No. 2,337,172 mentioned hereinbefore. Alternatively washing may be effected by redispersing the coagulum in water at elevated temperature using a small amount of alkali, e.g. sodium or ammonium hydroxide, recoagulating by addition of an acid to reduce the pH to the coagulation point and subsequently removing the supernatant liquid. This redispersion and recoagulation operation may be repeated as many times as is necessary.

After the washing operation, the coagulum is redispersed to form a photographic emulsion suitable for the subsequent finishing and coating operations by treating, preferably at a temperature within the range of about 35° to about 70° C, with the required quantity of water, normal gelatin and, if necessary, alkali for a time sufficient to effect a complete redispersal of the coagulum. Instead or in addition to normal gelatin, which is preferably used, other known photographic hydrophilic colloids can also be used for redispersion e.g. a gelatin derivative as referred to above, albumin, agar-agar, sodium alginate, hydrolysed cellulose esters, polyvinyl alcohol, hydrophilic polyvinyl copolymers, etc.

After washing and redispersing, the emulsions can be sensitized chemically according to any of the accepted procedures e.g. as described on page 107 of the December 1971 issue of Product Licensing Index published by Industrial Opportunities Ltd., Havant England — and in the patent literature referred to therein. The emulsion may be digested in the presence of small amounts of sulphur group sensitizers e.g. sulphur, selenium and tellurium sensitizers e.g. allyl isothiocyanate, thiourea, allyl thiourea, sodium thiosulphate, thioacetamide, allyl selenourea, allyl tellurourea, colloidal selenium, etc. The emulsion may also be sensitized by means of reductors e.g. tin compounds as described in Belgian Pat. Nos. 493,464 filed Jan. 24, 1950 by Gevaert Photo-Producten N.V. and 568.687 filed June 18, 1958 by Gevaert Photo-Producten N.V., iminoaminomethane sulphinic acids as described in British Pat. No. 789,823 filed Apr. 29, 1955 by Gavaert Photo-Producten N.V., polyamines e.g. diethylene triamine, spermine and bis(β-aminoethyl)sulphide, thiourea dioxide, etc. Reduction sensitization may also occur by digestion at low pAg values as described by H. W. Wood, J. Phot. Sci. 1 (1953) 163.

The emulsions may also be sensitized by noble metal-sensitization. Noble metal sensitization preferably occurs by digestion with a gold compound but any of the other known noble metal sensitizers e.g. ruthenium, rhodium, palladium, iridium and platinum compounds as described by R. Koslowsky, Z. Wiss. Phot. 46, 65–72 (1951) may be used. Representative examples of noble metal sensitizers are gold (III) chloride, gold(I) sulphide, potassium aurithiocyanate, potassium chloroaurate, ammonium chloropalladate, potassium chloroplatinate, etc.

Before coating on a support, any one or more of the common so-called coating finals may be added to the photographic silver halide emulsions prepared in accordance with the present invention. These coating finals include spectral sensitizers, colour couplers, antifoggants and emulsion stabilizers, coating aids, plasticizers, light-absorbing dyes, hardeners, development modifiers, etc. a survey of which can be found on pages 107–109 of the December 1971 issue of Product Licensing Index, published by Industrial Opportunities Limited, Havant, England.

The silver halide emulsions prepared in accordance with the present invention may be coated on the wide variety of supports known for use in photographic silver halide elements which include cellulose nitrate film, cellulose acetate film, poly(vinyl acetal) film, polystyrene film, poly(ethylene terephthalate) film, polycarbonate film and related films or resinous materials, as well as glass, paper, metal and the like. Paper supports may be used which are partially acylated or coated with baryta and/or an α-olefin polymer, particularly a polymer of an α-olefin containing from 2 to 10 C-atoms such as polyethylene, polypropylene, ethylenebutylene copolymers and the like.

The following examples illustrate the present invention.

EXAMPLE 1

This example illustrates the effect on the average silver halide grain size of silver halide grain ripeners corresponding to the above formula.

Silver halide emulsions were prepared by simultaneous addition for 30 min. of 3 molar silver nitrate and 3 molar potassium halide solutions as listed in the table hereinafter at a rate of 20 ml/min to an agitated solution of 30 g of inert gelatin in 500 ml of demineralized water comprising one of the silver halide grain ripeners in the amount given. During precipitation the pH was maintained at 5.8, the temperature at 65° C and the pAg at the value listed in the table hereinafter.

The emulsion formed was coagulated, washed and redispersed in the usual way.

Table

| Silver halide grain ripener | Amount | Halide | pAg | Average grainsize nm |
|---|---|---|---|---|
| none | none | 100 mole % $Cl^-$ | 6.5 | 300 |
| methionine | 1 g | " | " | 330 |
| methionine | 5 g | " | " | 900 |
| methionine | 10 g | " | " | 1100 |
| N-acetyl methionine | 10 g | " | " | 1100 |
| methionine methyl ester hydrochloride | 10 g | " | " | 800 |
| N-acetyl methionine methyl ester | 10 g | " | " | 700 |
| none | none | 50 mole % $Cl^-$ and 50 mole % $Br^-$ | 6.5 | 200–300 |
| methionine | 10 g | " | " | 600–800 |
| none | none | 100 mole % $Br^-$ | 8.2 | 200 |
| ethionine | 10 g | " | " | 600 |
| N-acetyl methionine | 10 g | " | " | 400 |
| N-acetyl methionine methyl ester | 4.8 g | " | " | 350 |
| methionine methyl ester hydrochloride | 10 g | " | " | 400 |
| methionine dipeptide hydrochloride | 4.5 g | " | " | 450 |

The silver bromide and silver chloride emulsions are all monodisperse emulsions whereas the silver chlorobromide (50:50 mole %) emulsions are heterodisperse emulsions.

EXAMPLE 2

Emulsion I

A monodispersed cubic silver bromide emulsion was prepared by simultaneous addition of a 3 molar silver nitrate and a 3 molar potassium bromide solution at a rate of 20 ml/min. for 20 min. to an aqueous mixture of phthaloyl gelatin and inert gelatin (2:1) comprising 20 g of DL-methionine. During precipitation the pH was maintained at 7.5, the pAg at 8.2 and the temperature at 65° C. After a physical ripening stage of 5 min., the pH was lowered to 3.5 by the addition of diluted sulphuric acid. The coagulate formed, after removal of the supernatant liquid was washed twice with water, the first wash water comprising polystyrene sulphonic acid. The coagulate was redispersed by addition of gelatin and water so as to obtain a silver bromide emulsion comprising per kg an amount of silver bromide corresponding to 100 g of silver nitrate.

Emulsion II

This emulsion was prepared in the same way as emulsion I except that precipitation occurred at pH 6 so that, to reach approximately the same average grain-size, precipitation-time was 45 min.

Emulsion III

This emulsion was prepared in the same way as emulsion I except that the methionine was replaced by 17 g of DL-ethionine.

Emulsion IV

This emulsion was prepared in the same way as emulsion I except that the DL-methionine was replaced by 1 g of 1,8-dihydroxy-3,6-dithiaoctane prepared as described in British Pat. No. 950,089 filed Sept. 30, 1960 by Eastman Kodak Company, and the precipitation-time was adapted to 45 min. in order to obtain approximately the same average grain-size.

Emulsion V

This emulsion was prepared in the same way as emulsion IV except that precipitation occurred at pH 6 instead of pH 7.5. For this emulsion too the precipitation-time was 45 min. to obtain approximately the same average grain-size.

Emulsion VI

This emulsion was prepared in the same way as emulsion V except that now 2.6 g of 1,8-dihydroxy-3,6-dithiaoctane prepared as described in British Pat. no. 950,089 were used so that precipitation-time could be reduced to 20 min. for approximately the same average grain-size.

Emulsion VII

This emulsion was prepared in the same way as emulsion IV except that precipitation occurred at pH 2, so that inert gelatin was used instead of the phthaloyl-gelatin and washing occurred by chilling, shredding and leaching with cold water. For this emulsion too the precipitation-time was 45 min. to reach approximately the same average grain-size.

The emulsions were coated on a conventional film support so as to obtain per sq. m. an amount of silver bromide corresponding to 10 g of silver nitrate.

To determine formation of fog, the materials formed were developed without exposure for 3 min. at 20° C in a developer of the following composition:

| | | |
|---|---|---|
| water | 800 | ml |
| p-monomethylaminophenol sulphate | 1.5 | g |
| sodium sulphite (anhydrous) | 50 | g |
| hydroquinone | 6 | g |
| sodium carbonate (anhydrous) | 32 | g |
| potassium bromide | 2 | g |
| water to make | 1000 | ml. |

The results attained are listed in the following table.

Table

| | Emulsion | Precipitation pH | Precipitation time | Average grain-size nm | Fog |
|---|---|---|---|---|---|
| I | (20 g of methionine) | 7.5 | 20 min. | 960 | 0.09 |
| II | (20 g of methionine) | 6 | 45 min. | 1010 | 0.15 |
| III | (17 g of ethionine) | 7.5 | 20 min. | 1100 | 0.04 |
| IV | (1 g of 1,8-di-hydroxy-3,6-dithio-octane) | 7.5 | 45 min. | 1050 | 0.50 |
| V | (1 g of 1,8-di-hydroxy-3,6-dithio-octane) | 6 | 45 min. | 1010 | 0.60 |
| VI | (2,6 g of 1,8-di-hydroxy-3,6-dithio-octane) | 6 | 20 min. | 830 | 1.35 |
| VII | (1 g of 1,8-di-hydroxy-3,6-dithio-octane) | 2 | 45 min. | 980 | 0.06 |

The above results show that methionine and ethionine are effective grain-ripeners without increasing fog to a noteworthy extent and that the prior art thioether grain-ripener 1,8-dihydroxy-3,6-dithiooctane gives unacceptable fog-values unless precipitation takes place at pH 2 which makes coagulation washing using phthaloyl gelatin at the precipitation stage impossible. The results also show that the effect of methionine is pH-dependent so that precipitation time can be reduced by increasing the pH without increasing fog. On the contrary, with 1,8-dihydroxy-3,6-dithiooctane, the precipitation time cannot be reduced by increasing the pH. It can be reduced by using larger amounts but with the results that the fog is further increased.

EXAMPLE 3

Emulsion VIII

A monodispersed cubic silver bromide emulsion was prepared by simultaneous addition for 25 min. of 3 molar silver nitrate and 3 molar potassium bromide solutions at a rate of 20 ml/min. to an aqueous gelatin-solution comprising 20 g of DL-methionine. During precipitation, the pH was maintained at 7.5, the pAg at 8.2 and the temperature at 65° C.

The emulsion was further ripened for 5 min. whereupon the emulsion was chilled, shredded and washed with cold water.

The emulsion was redispersed as described for emulsion I in example 2.

Emulsion IX

The emulsion was prepared in the same way as emulsion VIII except that the precipitation occurred at pH 6 and that the methionine was replaced by 3 g of 1,8-dihydroxy-3,6-dithiaoctane prepared as follows:

To a solution of 400 g (10 moles) of sodium hydroxide in 3 l of methanol, 780 g (10 moles) of β-mercaptoethanol were added with stirring and while keeping the whole under a nitrogen atmosphere. The mixture was heated to the boiling point whereupon 495 g (5 moles) of 1.2-dichloroethane were added at such a rate that the reaction mixture kept boiling. Boiling was then continued for 4 hours. The reaction mixture was allowed to cool to room temperature, and after removal of the formed sodium chloride by filtration washed with a little methanol. The filtrate was concentrated under reduced pressure in a rotary evaporator. 200 ml of toluene were added and the mixture was distilled. This operation was carried out three times in order to remove the water. The residue was boiled with 2 liters of chloroform, filtered and cooled with stirring. The precipitate was dried till constant weight at 50° C. Yield: 798 g (87%). Melting point: 64° C. Analysis by thin layer chromatography showed that the product contained only 0.2% of bis(β-hydroxyethyl)disulphide.

Emulsion X

This emulsion was prepared as emulsion IX except that before use the 1,8-dihydroxy-3,6-dithiaoctane was further purified by chromatography according to the method described by H. Halpaap (Chemie-Ingenieur-Technik Vol. 35, no. 7, p. 488–493, July 1963) and by E. Von Arx (Journal of Chromatography 64 (1972) 297–303). Adsorbent Kiezelgel 60 PF 254 (Merck Art 7747) and ethylacetate as diluent.

In this manner 8 g of purified product were obtained from 15 g. The melting point is 64° C and no more bis (β-hydroxyethyl)disulphide could be detected.

Emulsion XI

This emulsion was prepared as emulsion X except that the precpitation occurred at pH 7.5.

Emulsion XII

This emulsion was prepared as emulsion X except that the precipitation occurred at pH 4.5.

The emulsions were coated and developed as described in example 2.

The results attained are listed in the following table.

Table

| Emulsion | Precipitation pH | Precipitation time | Average grain-size nm | Fog |
|---|---|---|---|---|
| XIII | 7.5 | 25 min. | 1300 | 0.09 |
| IX | 6 | 25 min. | 1320 | 0.40 |
| X | 6 | 25 min. | 1300 | 0.29 |
| XI | 7.5 | 25 min. | 1300 | 0.40 |
| XII | 4.5 | 25 min. | 1300 | 0.30 |

The above results show the superiority of methionine over 1,8-dihydroxy-3,6-dithiaoctane as silver halide grain ripener. Even by extra purification and decrease of the pH, the fog-values obtained with the prior art thioether grain ripener are markedly higher than those obtained with methionine.

EXAMPLE 4

A silver bromide emulsion A was prepared by simultaneous addition for 45 min. of a 3 molar silver nitrate and a 3 molar potassium bromide solution at a rate of 20 ml/min. to an aqueous solution of 45 g of gelatin in 500 ml of dimineralized water. During precipitation the pH was maintained at 5.8 (the pH of the aqueous gelatin) the pAg at 8.2 and the temperature at 65° C.

Other emulsions were made under the same circumstances with the only difference that precipitation occurred in the presence of methionine added at different stages of precipitation. For emulsion B, 20 g of methionine were added to the aqueous gelatin solution before precipitation started. For emulsion C, 7 g of methionine were added to the aqueous gelatin solution before precipitation started whereupon 7 g were added after 15 min. of precipitation and 6 g were added after 30 min. of precipitation. For emulsion D, the 20 g of methionine were added to the potassium bromide solution before precipitation started and thus added continuously over the whole period of precipitation.

The emulsions were chilled, shredded and washed with cold water and were redispersed in the usual way.

From photo micrographs of the emulsions formed, the average grain sizes were determined:

emulsion A: 200 nm
emulsion B: 1000 nm
emulsion C: 500 nm
emulsion D: 400 nm

The above results show that the highest effect on the grain growth is obtained when all methionine is added right from the start of precipitation.

EXAMPLE 5

A series of silver bromide emulsions were prepared as described for emulsion B in example 4 with the difference that precipitation-time was 30 min. and the pH and pAg had one of the values listed in the table hereinafter.

The emulsions were coated on a film support as described in example 2 and after exposure in a sensitometer developed for 3 min. at 20° C in the developer of example 2.

The results are listed in the following table.

Table

| Emulsion | pH | pAg | Average grain size nm | Fog | Gamma | $D_{max}$ |
|---|---|---|---|---|---|---|
| E | 4.5 | 6.6 | 500 nm | 0.04 | 1.35 | 1.90 |
| F | 4.5 | 8.2 | 700 nm | 0.04 | 1.55 | 1.88 |
| G | 4.5 | 10.7 | 400 nm | 0.03 | 1.55 | 2.46 |
| H | 7 | 6.6 | 600 nm | 0.08 | 1.05 | 2.15 |
| I | 7 | 7.3 | 800 nm | 0.05 | 0.5 | 1.30 |
| J | 7 | 8.2 | 800 nm | 0.04 | 0.4 | 1.06 |
| K | 7 | 9.0 | 600 nm | 0.03 | 1.4 | 1.94 |
| L | 7 | 9.8 | 500 nm | 0.03 | 1.6 | 2.64 |
| M | 7 | 10.7 | 450 nm | 0.04 | 1.6 | 2.36 |

The above results show the dependency of grain-growth on pAg and pH. At pH 7 highest grain-growth is obtained at a pAg value between about 7.3 and 8.2. At pH 4.5 also highest grain growth is obtained at pAg 8.2.

EXAMPLE 6

A series of silver bromide emulsions were prepared as described in example 4 either or not in the presence of a grain-ripener while maintaining the pH at a value as listed in the table hereinafter (by addition of sodium or ammonium hydroxide or sulphuric acid).

The average grain-sizes of the emulsions obtained and the fog values after exposure and development as described in example 5 are listed in the following table.

Table

| pH | grain-ripener | Average grain-size nm | Fog |
|---|---|---|---|
| 5.8 | — | 200 | 0.03 |
| 5.8 | 20 g of methionine | 1000 | 0.04 |
| 8 ($NH_4OH$) | 20 g of methionine | 1900 | 0.10 |
| 8 (NaOH) | 20 g of methionine | 1900 | 0.18 |
| 4 ($H_2SO_4$) | 20 g of methionine | 700 | 0.04 |
| 3.5 ($H_2SO_4$) | 1 g of 1,8-dihydroxy-3,6-dithiaoctane as used in emulsion X of example 2 | 700 | 0.11 |
| 5.8 | 1 g of 1,8-dihydroxy-3,6-dithiaoctane as used in emulsion X of example 2 | 700 | 0.13 |
| 8 (NaOH) | 1 g of 1,8-dihydroxy-3,6-dithiaoctane as used in emulsion X of example 2 | 700 | 0.26 |

The above results show that grain-growth in the presence of methionine is dependent on pH whereas with the prior art thioether grain-ripener grain-growth remains constant. The improved fog values obtained with methionine are also apparent from the above results.

EXAMPLE 7

Comparison Emulsion conventional silver bromoiodide emulsion for nondestructive testing with an average grain diameter of 700 nm and containing 0.35 mole % of iodide was prepared by adding over a period of about 7 minutes a 3 molar ammoniacal silver nitrate solution to an agitated aqueous gelatin solution to which a 3 molar ammonium bromide and 3 molar potassium iodide solution had been added in an amount equivalent to the amount of silver nitrate and so that the above ratio of bromide to iodide is obtained. The temperature was kept at 38° C.

After a physical ripening stage of 4 minutes, the emulsion was coagulated by the addition of ammonium sulphate, washed and redispersed in the usual manner.

Finally, water and gelatin were added in order to obtain a conentration of silver halide expressed as silver nitrate, of 200 g per kg emulsion and a ratio of gelatin to silver halide (expressed as silver nitrate) of 0.4.

Emulsion of the Invention

A monodisperse silver bromide emulsion, having an average grain size of 800 nm was prepared by adding simultaneously over a period of about 45 minutes a 3 molar aqueous solution of silver nitrate and a 3 molar aqueous solution of potassium bromide at a rate of 50 ml/minute to an agitated gelatin solution containing 40 g of dl-methionine.

The temperature was maintained at 65° C, the pH at 4 and the pAg at 8.2 during the precipitation. After a physical ripening stage of 10 minutes, the emulsion was cooled to 40° C and the pH was lowered to 3 by the addition of diluted sulphuric acid. The emulsion was coagulated by adding a solution of polystyrene sulphonic acid, washed and redispersed in the usual manner.

Finally, water and gelatin were added in order to obtain a concentration of silver halide expressed as silver nitrate of 200 g per kg emulsion and a ratio of gelatin to silver halide (expressed as silver nitrate) of 0.4.

Test portions of the emulsions were coated at pH 6.0 and pAg 8.0 on one side of a film support at coverages of 10 g of silver halide, expressed as silver nitrate, per sq.m. and the coated emulsions were exposed for $10^{-4}$ sec in a Mark VI Sensitometer of EG & G, Inc., Boston, Mass., USA using a General Electric type FT 118 electronic flash tube with a radiant energy of 100 Wattsec.

The sensitivity was measured at density 0.5 above fog after processing as follows:

5 min rinsing in running tap water (15° C)

10 min development at 20° C in the developer of the composition:

| | |
|---|---|
| p-monomethylaminophenol sulphate | 2.50 g |
| d-isoascorbic acid | 10.0 g |
| potassium bromide | 1.0 g |
| sodium metaborate-4-water | 35.0 g |
| water to make | 1.0 liter |

5 min rinsing in running tap water (15° C)

10 min fixing at 20° C in the fixing bath of the following composition:

| | |
|---|---|
| anhydrous sodium thiosulphate | 130.0 g |
| potassium metabisulphite | 25.0 g |
| water to make | 1.0 liter |
| | (pH : 4.55) |

and 10 min rinsing in running tap water (15° C).

It was found that when the comparison emulsion is given a relative speed of 100, the emulsion of the invention has a relative speed value of 295 which means almost 3 times more sensitive.

EXAMPLE 8

The emulsions of example 7 were sulphur and gold sensitized in the presence of toluene thiosulphonic acid by addition of sodium thiosulphate and hydrogen tetrachloroaurate-4-water and heating at 50° C until the optimum sensitivity-fog relationship was reached.

To each of the chemically sensitized emulsions, 5-methyl-7-hydroxy-s-triazolo-[1,5-a]pyrimidine was added as an emulsion stabilizer in an amount of 5 mmole per mole of silver halide. After addition of coating aids the emulsions were coated at pH 5 and pAg 8.5 on both sides of a film support at a total coverage of silver halide corresponding to 30 g per sq.m of silver nitrate.

The materials obtained were exposed in an X-ray sensitometer using a rontgen tube so that at a distance of one yard the half layer value is 0.5 mm Cu (about 83 kV and 10 mA).

The exposed emulsions were developed for 7 min at 21° C in a developer comprising:

| | |
|---|---|
| p-monomethylaminophenol sulphate | 3.5 g |
| anhydrous sodium sulphite | 60 g |
| hydroquinone | 10 g |
| boric acid | 7.5 g |
| sodium hydroxide | 17.5 g |
| potassium bromide | 4 g |
| water to make | 1000 ml |
| | (pH ± 11) |

and then fixed and rinsed in the usual way.

The sensitometric values obtained with fresh materials and materials stored before exposure and processing for 36 hours at 57° C and 34% relative humidity are listed in the following table. The values given for the speed are relative values measured at density 2 above fog; a value of 100 is given to the non-stored comparison emulsion.

Table 2

| | Fresh materials | | Stored materials | |
|---|---|---|---|---|
| Emulsion | Fog* | Relative speed | Fog* | Relative speed |
| comparison | 0.30 | 100 | 0.36 | 100 |
| of invention | 0.33 | 141 | 0.42 | 148 |

*including the density of the film support.

EXAMPLE 9

A monodispersed cubic silver bromide emulsion having an average grain size of about 700 nm was prepared by adding simultaneously for 45 min a 3 molar aqueous solution of silver nitrate and a 3 molar aqueous solution of potassium bromide at a rate of 50 ml/min to an agitated gelatin solution containing 35 g of dl-methionine.

The pH was maintained at 5.8, the temperature at 65° C and the pAg at 8.2 during precipitation.

After cooling the emulsion to 40° C, the pH was lowered to 3 by means of diluted sulphuric acid. By addition of polystyrene sulphonic acid the emulsion was coagulated whereupon it was washed and redispersed in the usual manner. Water and gelatin were added as described in Example 7 for the emulsion of the invention. The emulsion was divided into several portions. One portion (emulsion A) was not chemically sensitized whereas the other portions were chemically sensitized as follows:

emulsion B: digestion for 35 min at 48° C, pH 5 and pAg 2.65 emulsion C: digestion for 35 min at 48° C, pH 5 and pAg 2.65 in the presence of sodium thiosulphate emulsion D: digestion for 35 min at 48° C, pH 5 and pAg 2.65 in the presence of sodium sulfite and hydrogen tetrachloroaurate.

emulsion E: digestion for 35 min at 48° C, pH 5 and pAg 2.65 in the presence of sodium sulfite, sodium thiosulfate and hydrogentetrachloroaurate.

After addition of 5-methyl-7-hydroxy-s-triazolo[1,5-a] pyrimidine, coating aid and hardener, and adjusting the pH to 5 and the pAg to 6.8 the emulsion portions were coated on both sides of a film support so that per side about 15 g of silver halide (expressed as silver nitrate) was present per sq.m.

After drying the emulsions were exposed and developed as described in example 8.

The results obtained are listed in the following table. The values given for the speed are relative values measured at density 1.5 above fog; a value of 100 was given to the non-chemically sensitized emulsion A.

| emulsion | g $AgNO_3$/sq. m | Fog | Relative speed | Gamma |
|---|---|---|---|---|
| emulsion A | 30.7 | 0.17 | 100 | 4.41 |
| emulsion B | 28.2 | 0.18 | 120 | 4.54 |
| emulsion C | 30.0 | 0.20 | 138 | 4.61 |
| emulsion D | 29.2 | 0.19 | 148 | 4.41 |
| emulsion E | 28.0 | 0.23 | 142 | 4.54 |

EXAMPLE 10

A lithographic silver chlorobromoiodide emulsion was prepared by simultaneous addition for 25 min of a 3 molar silver nitrate solution and a 3 molar solution of 84 mole % chloride, 15.5 mol % bromide and 0.5 mol % iodide at a rate of 50 ml/min to an aqueous mixture of 100 g of inert gelatin and 12 g of methionine in 2500 ml of water. During precipitation the pH was maintained at 4, the pAg at 7.95 and the temperature at 55° C. After a physical ripening stage of 5 min, the pH was lowered to 3.5 by addition of diluted sulphuric acid. The coagulate formed was washed and redispersed in the usual manner.

A monodisperse emulsion was obtained having an average silver halide grain-size of approximately 300 nm.

The emulsion was then chemically sensitized by digestion with a sulphur sensitizer and a gold-sensitizer in the conventional way.

After addition of the ingredients listed in the table hereinafter and other common emulsion ingredients and coating aids the emulsion was coated on a conventional film support and dried.

The sensitometric results obtained with film strips after exposure through a continuous wedge with constant 0.20 and development at 20° C for 3 min in a conventional metolhydroquinone developer (MQ development) or at 26° C for 2 min 30 sec in a hydroquinone-formaldehydebisulphite developer (lith-development) are listed in the table hereinafter.

The results are compared with results obtained with a conventional lith-material of the same halide composition, same average grain-size and to which the same ingredients were added.

The values given for the speed are relative values for the speed measured at density 1 above fog; a speed of 100 is given to the conventional freshly prepared lith-material to which 6 g of cadmium chloride was added per mole of silver halide.

Table

| | | MQ-development | | | | | | Lith-development | | |
|---|---|---|---|---|---|---|---|---|---|---|
| | ingredients per mol | fresh material | | | material stored days 57° C/34% RH | | | fresh material | | |
| Material | silver halide | fog | speed | γ | fog | speed | γ | fog | speed | γ |
| conventional | 6 g of cadmium chloride | 0.06 | 100 | 5.90 | 0.07 | 158 | 5.80 | 0.04 | 100 | 6.50 |
| methionine-ripened | " | 0.06 | 141 | 6.20 | 0.08 | 174 | 6.75 | 0.04 | 214 | 6.25 |
| conventional | 0.34 g of stabilizer* + 1.7 g of Nickelnitrate | 0.06 | 69 | 5.75 | 0.08 | 115 | 5.50 | 0.04 | 79 | 6.10 |
| methionine-ripened | " | 0.06 | 100 | 6.25 | 0.08 | 145 | 6.25 | 0.04 | 120 | 7.10 |
| conventional | 0.34 g of stabilizer* + 4.25 g of Ceriumnitrate | 0.06 | 72 | 5.65 | 0.08 | 117 | 5.90 | 0.04 | 79 | 6.00 |
| methionine-ripened | " | 0.06 | 107 | 6.40 | 0.08 | 132 | 6.10 | 0.04 | 129 | 6.50 |

*stabilizer = 5-methyl-7-hydroxy-s-triazolo[1,5-a]pyrimidine.

The above results show that with an emulsion according to the present invention improved speed and γ-values can be obtained as compared with a conventional emulsion of the same average grain-size.

What we claim is:

1. A method for preparing a silver halide emulsion which comprises the step of precipitating silver halide grains in an aqueous solution of peptizer and adding to the peptizer solution a silver halide grain ripener to accelerate grain growth wherein before or during precipitation from about 500 mg to about 30 g of a silver halide grain ripener corresponding to the following formula is added to the peptizer solution per mole of silver halide to be formed:

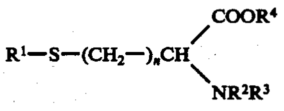

wherein:

*n* is an integer from 1 to 5

$R^1$ is a $C_1$–$C_5$ alkyl group $R^2$ is hydrogen, a $C_1$–$C_5$ alkyl group or a carboxylic acyl group $R^3$ is hydrogen, a $C_1$–$C_5$ alkyl group or substituted alkyl, and $R^4$ is hydrogen, a $C_1$–$C_5$ alkyl group, an aryl group or a salt-forming cation.

2. A method according to claim 1, wherein the silver halide grains are formed by running an aqueous solution of silver nitrate and an aqueous solution of water-soluble halide(s) simultaneously into an aqueous solution of a peptizer containing the said compound.

3. A method according to claim 1, wherein the peptizer is gelatin, a gelatin derivative or a mixture of gelatin and a gelatin derivative.

4. A method according to claim 1, wherein the silver halide grains are precipitated while maintaining the pH at a value between about 4 and about 9 and the pAg at a value between about 5 and 11.

5. A method according to claim 4, wherein the halide of the silver halide grains is predominantly silver bromide and the pAg during precipitation is maintained at a value between about 7.7 and about 9.7.

6. A method according to claim 4, wherein the halide comprises at least 50 mole % chloride, at least 5 mole % bromide and from 0 to 5 mole % iodide.

7. A method according to claim 1, wherein the pH is maintained at a value between about 5 and about 7.5.

8. A method according to claim 1, wherein the pAg is maintained at a value between about 6 and about 9.7.

9. A method according to claim 1, wherein the silver halide grains are precipitated so as to obtain monodispersed silver halide grains of which at least 95% by weight or number have a diameter which is within about 40% of the mean grain-diameter.

10. Method according to claim 1, wherein the silver halide grains are precipitated in an acid-coagulable gelatin derivative or a mixture of gelatin and an acid-coagulable gelatin derivative and the emulsion is subsequently washed by coagulation washing.

11. Method according to claim 10, wherein the acid-coagulable gelatin derivative is phthaloyl gelatin.

12. Method according to claim 1, wherein the said compound is methionine.

13. Method according to claim 1, wherein the said compound is ethionine or N-acetylmethionine.

* * * * *